Figure 1:
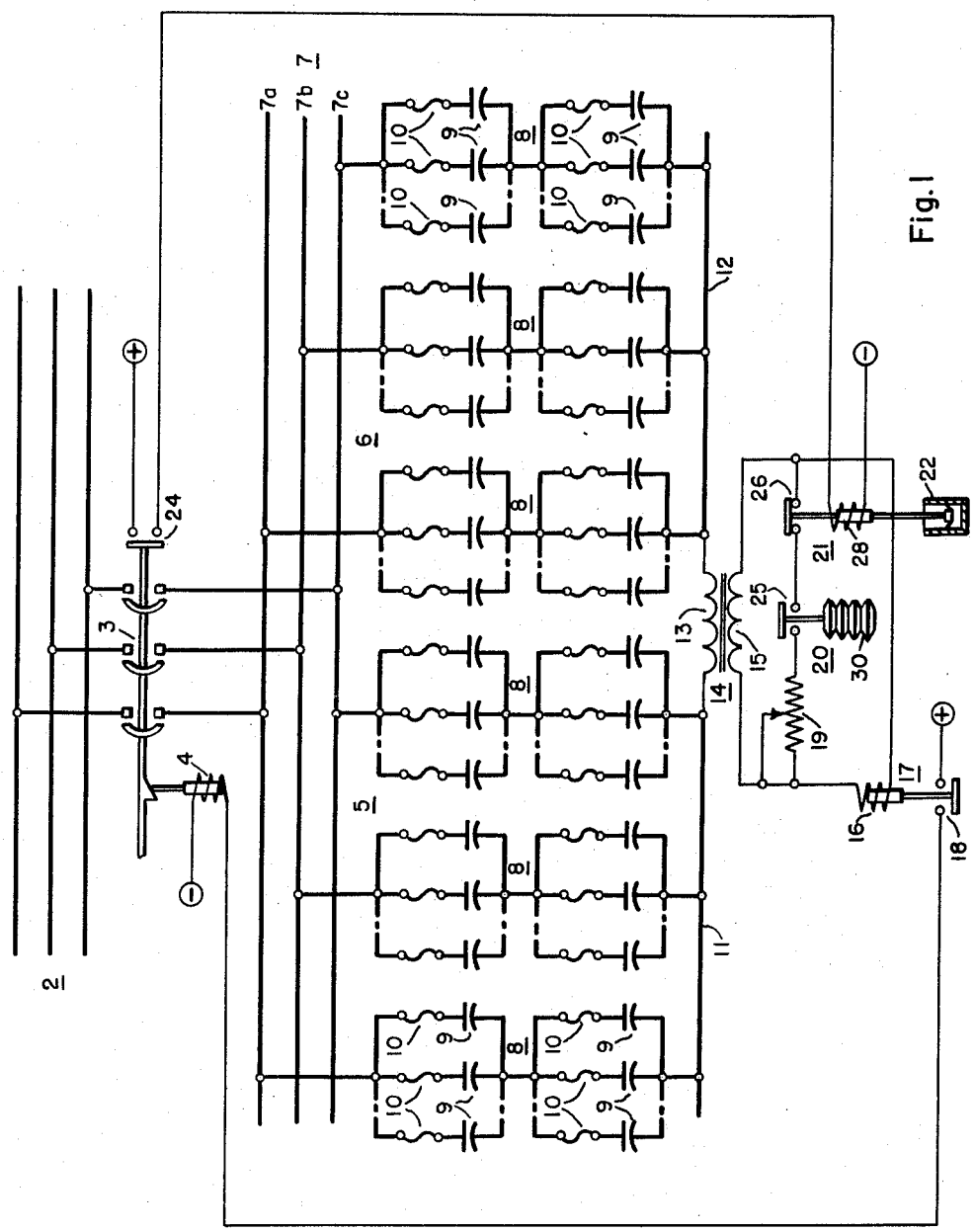

May 26, 1959 — W. H. CUTTINO — 2,888,613
CAPACITOR PROTECTION SCHEME
Filed Oct. 9, 1956 — 2 Sheets-Sheet 1

WITNESSES
Leon J. Taza
E. H. Liss

INVENTOR
William H. Cuttino
BY
ATTORNEY

United States Patent Office 2,888,613
Patented May 26, 1959

2,888,613

CAPACITOR PROTECTION SCHEME

William H. Cuttino, Wilkinsburg, Pa., assignor to Westinghouse Electric Corporation, East Pittsburgh, Pa., a corporation of Pennsylvania Application October 9, 1956, Serial No. 614,888

12 Claims. (Cl. 317—12)

The present invention relates to shunt capacitor banks and more particularly to capacitor banks for operation where very low ambient temperatures may occur.

Power capacitor units such as are used in shunt capacitor banks for power factor correction consist of wound capacitor sections of interleaved metal foil and paper, enclosed in a case and impregnated with a dielectric liquid which is usually a synthetic hydrocarbon, such as a chlorinated diphenyl composition. The molecules of chlorinated diphenyl compositions do not have their charges evenly distributed about a common center and so appear to have a positive charge on one side and a negative charge on the opposite side. This is known as a dipole or polar molecule. When voltage is applied the molecules try to line up with the field by rotation from their normally random position. The net displacement of charges in the direction of the field in this manner produces a charge of electricity. Decreasing temperature is accompanied by increasing viscosity of the dielectric. At a temperature near the pour point the liquid thickens to such an extent that it becomes very difficult for a dipole molecule to follow the 60-cycle voltage. When the temperature drops to a value near or below the pour point, the consequent lowering of the dielectric constant results in a 25% drop in capacitance with respect to normal operating capacitance.

The temperature range at which this drop in capacitance occurs depends upon the composition of the dielectric and the applied frequency. With one type of dielectric composition now in use a drop in temperature from −30° C. to −45° C. causes a 25% drop in capacitance as the molecules become frozen in place. When another type of dielectric is used, a drop in temperature from 0° C. to −10° C. results in a drop in capacitance of approximately 25%. A drop in capacitance occurs at higher temperature values when higher frequencies than 60 cycles are applied.

As the temperature passes through the region where the viscosity of the dielectric sensibly impedes the dipole rotation, the molecular friction is increased greatly. Dielectric losses climb to a high value. These losses are transitory, however. After a relatively brief interval of time following the initial operation of the capacitor, the temperature of the dielectric rises to a normal operating value because of the heat produced by the dielectric losses. The tendency toward increasing losses with lower temperature has a practical advantage in that the dielectric, when the capacitor is in continuous operation, maintains itself at a temperature high enough to prevent solidification of the liquid and loss of capacitance.

However, when these capacitors are energized after being out of service long enough to attain the ambient temperature, at temperatures at or below the range in which the capacitance drops, the capacitance remains low for a relatively brief interval of time. After the capacitor has continued to operate for a period of time the dielectric losses cause the temperature of the dielectric to rise to a temperature range above the range where any significant capacitance loss occurs.

When a relatively large amount of capacitance is required, the usual arrangement is to utilize the necessary number of relatively small capacitors of standard KVAR and voltage ratings connected together in a bank in a suitable series-parallel arrangement. When a large number of capacitors is connected in a bank in this manner, the possibility of dielectric failure in one or more of the capacitors is always present, and if a faulted capacitor is not immediately removed from the circuit, the internal arc in the capacitor is likely to cause rupture of the case and damage to adjacent good capacitors. For this reason it is customary to connect an individual fuse in series with each capacitor unit, so that the fuse will blow and disconnect its capacitor from the bank immediately upon failure of the capacitor.

In the usual arrangement of large high voltage capacitor banks, the capacitors are connected in groups, each group consisting of a plurality of capacitors connected in parallel and a number of such groups is connected in series. If a fuse blows on one or more of the capacitors in one of these groups of paralleled capacitors, the impedance of that group is increased and the voltage no longer divides equally among the series connected groups, but increases on the group containing the faulted capacitor. Standard capacitors are designed for continuous operation at a voltage not exceeding 110% of the rated voltage, and if an overvoltage of more than 10% occurs on a group of capacitors because of failure of one or more of them, the remaining capacitors are endangered by the overvoltage. It is necessary, therefore, to provide some protective system which will prevent the capacitors from being subjected to a continuous overvoltage of more than 10%.

One protective system which is frequently used for capacitor banks utilizes potential transformers connected across each phase of the bank to measure the phase voltages, with the secondaries of the transformers connected to a relay in such a way that the relay responds to the zero sequence voltage. When the voltages across the three phases are balanced there is no net voltage applied to the relay, but if the voltages become unbalanced as the result of the blowing of individual capacitor fuses, the relay responds to the zero sequence voltage and effects disconnection of the capacitor bank from the line.

Another scheme for protecting Y-connected capacitor banks consists in dividing the bank into two equal and parallel Y—Y sections with a current transformer connected between the neutrals for energizing a relay for detecting capacitance unbalance. Normally, the capacitance in each leg is the same and the voltage drop between the neutrals of the two sections is zero. Should one or more of the capacitors fail in one section, the impedance changes and the sections become unbalanced and there will be a voltage difference between the neutrals of the two sections, so that a current will flow and the relay will operate to trip the circuit breaker and disconnect the bank from the line.

A number of capacitance unbalance protective schemes other than those described above have been devised to prevent damage due to failure of capacitor units in a bank. It can be seen that all of these protective schemes can result in undesirable tripping of the circuit breaker if the capacitor is left unenergized overnight during low temperature conditions when the sun shines more prominently on one face the next morning just prior to closing the breaker leaving one portion of the bank at low temperature and other sections at higher temperatures. In this case sufficient unbalance in capacitance can occur for the unbalance relay to trip the circuit breaker. This has been encountered in service.

Although capacitance unbalance due to initial lower temperature on one face of the capacitor bank does result in momentary over voltage on capacitor units when initially energized, the capacitors can satisfactorily withstand this overvoltage for the short interval of time, required for the capacitances to substantially balance with the increase in temperature of the capacitor units after being energized. It is therefore desirable to prevent the circuit breaker from tripping due to this momentary unbalance that may exist for a short interval upon closing the breaker after the capacitor has been allowed to cool to a low temperature.

The principal object of the present invention is to provide a scheme for desensitizing the capacitance unbalance relay for a short time following the closing of the circuit breaker when the ambient temperature is below a predetermined value to avoid unwanted tripping of the circuit breaker.

Another object of the invention is to provide a scheme for desensitizing the capacitance unbalance relay utilizing a temperature responsive relay to add a desensitizing resistance in the unbalance relay circuit.

A further object of the invention is to provide a scheme for desensitizing the capacitance unbalance relay utilizing a temperature responsive relay to add a desensitizing resistance in the unbalance relay circuit and to utilize a time delay relay to restore the sensitivity of the capacitance unbalance relay after a time interval of long enough duration to permit the temperature of the dielectric to rise to a value at which the capacitors have attained their normal capacitance rating.

Figure 2:
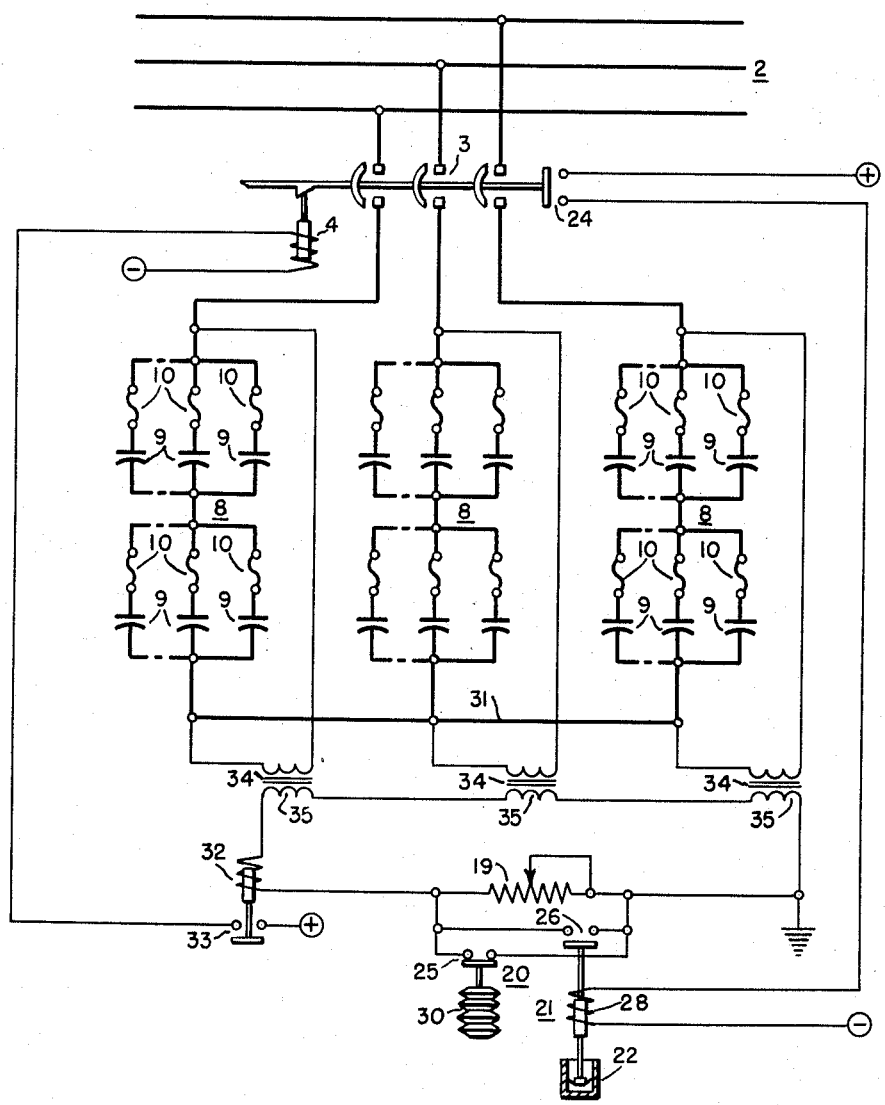

The invention will be more fully understood from the following detailed description, taken in connection with the accompanying drawings, in which:

Figure 1 is a schematic diagram showing a capacitor bank embodying the invention in conjunction with a current responsive unbalance relay; and Fig. 2 is a schematic diagram showing a capacitor bank embodying another modification of the invention for use with a voltage responsive unbalance relay.

Illustrated in the drawings are examples of two of a number of types of protective relaying schemes for detecting capacitor unbalance which incorporates the present invention. It will be understood that the present invention can be combined with any desired capacitor bank unbalance protection scheme. The embodiment shown in Fig. 1 is particularly useful where current unbalance detecting means are used and the modification disclosed in Fig. 2 is preferred to be used with voltage unbalance detecting means.

Referring to Fig. 1 of the accompanying drawings, the illustrated capacitor bank comprises by way of example, a three phase circuit 2 which is connected through a circuit breaker 3 to a three phase bus 7, comprising conductors 7a, 7b, 7c. Circuit breaker 3, which may be of any suitable type, is shown as having a trip coil 4 and may be actuated to closed position manually or in any other suitable manner. Across the bus 7, in parallel, are connected two equal Y-connected capacitor banks 5 and 6. Each phase of each bank comprises two groups 8 of three parallel-connected capacitors 9, each capacitor connected in series with an individual fuse 10. It is to be understood that any suitable number of capacitors in a series-parallel arrangement may be used to provide the desired capacitive KVAR. The neutrals 11 and 12 of capacitor banks 5 and 6 are connected by the primary winding 13 of a current transformer 14.

Transformer 14 has a secondary winding 15 which is connected to energize the operating coil 16 of a relay 17. The relay 17 has normally open contacts 18 which are connected to energize the trip coil 4 of circuit breaker 3 when contacts 18 are closed.

When each of the capacitor banks 5 and 6 are balanced, no current flows in their respective neutral conductors 11 and 12, since each phase has the same impedance, and consequently current flow through primary winding 13 of current transformer 14 is zero. Should one or more of the capacitors 9, in one of the groups 8, fail causing its fuse to blow and disconnect it from the back, the impedance of that group will be increased and the resultant impedance of that phase in which it is connected changed so that the vector sum of the currents in the neutral conductor will no longer be zero and current will flow. Thus current will flow in the primary winding 13 of transformer 14 and a voltage will be induced in the secondary winding 15 which energizes the relay 17 causing it to close its contacts 18 and trip the circuit breaker 3 to disconnect capacitor banks 5 and 6 from line 2.

By the same reasoning, if the temperature of one phase drops to a temperature at or below the range where the capacitance drops, while the temperature in the other phases remains in a normal operating temperature range, the capacitance of that phase will drop substantially resulting in an unbalanced condition of the capacitor bank. The impedance of the phase which is at a low temperature will be changed resulting in a current flow in the neutral conductor. As in the case where a capacitor fails the relay 17 will be energized causing it to close its contacts 18 and trip the circuit breaker 3 to disconnect the capacitor bank from the line.

Tripping of the circuit breaker 3 can occur when the capacitor bank, in an area where ambient temperature has dropped to a temperature at or below the range where the capacitance drops, has been out of service over night. If the capacitor bank is switched on the next morning when one or more phases have been in the shade and remained at low temperature while the remaining phase or phases have been exposed to sunlight and have reached higher temperatures, this undesirable tripping of the circuit breaker will occur. It is undesirable to have the circuit breaker trip under these conditions since overvoltage would occur on the individual capacitor units for only a short interval of time after being energized and no damage should occur as overvoltages can be tolerated for a short length of time.

In order to avoid this unnecessary loss of service of the capacitor bank, a desensitizing resistor 19 and the contacts 25 and 26 of a normally open temperature responsive relay 20 and a normally closed time delay relay 21, respectively, are connected in series across coil 16 of unbalance relay 17. Resistor 19 may be a variable resistor to enable proper adjustment during installation of the bank.

The temperature responsive element of relay 20 is represented in the drawings by a bellows 30 and the time delay element of relay 21 is represented by a dashpot 22. It is to be understood, of course, that any suitable type of temperature responsive relay and time delay relay may be used. Auxiliary contacts 24 of circuit breaker 3 are closed when the circuit breaker 3 is closed to energize relay coil 28 of relay 21. Any suitable low voltage supply source may be used to energize relay 21.

Resistance 19 is so adjusted as to divert enough current from relay coil 16 when resistance 19 is in the circuit so as to desensitize relay 17. When either temperature relay 20 or time delay 21 are open, resistance 19 is inoperative to desensitize relay 17. When the ambient temperature drops to a predetermined value, temperature responsive relay 20 closes. With the breaker 3 open relay 21 is normally closed, and resistance 19 is operable to desensitize unbalance relay 17 at low ambient temperatures when the breaker is first closed. When the circuit breaker 3 is closed and the capacitor bank is connected to the line, time delay relay 21 is activated, and after a predetermined time opens to remove resistance 19 from the unbalance relay circuit. Relay 21 is set to open after enough time has elapsed for the cold side of the capacitor bank to have reached normal temperature due to operating heat loss so when relay 21 has opened, there has been sufficient time for the capacitance to substantially balance to reduce the neutral current to approximately zero and the relay 17 will not be actuated to trip the breaker even though contacts 25 of relay 20 are not opened until later with increase in ambient temperature.

In Fig. 2 is shown an embodiment of the invention which is preferred in shunt capacitor bank installations which utilize voltage measuring means to detect capacitance unbalance. The specific capacitor bank shown and its unbalance protection scheme is by way of example only. Any suitable capacitor bank utilizing voltage measuring unbalance detection means may be utilized with this embodiment.

The capacitor bank shown in Fig. 2 is connected in shunt to the three-phase alternating current line 2 by means of a circuit breaker 3 which is shown as having a trip coil 4 and which may be actuated to closed position manually or by any suitable means. Each phase of the capacitor bank consists of a plurality of groups 8 of capacitor units 9, the groups of each phase being connected together in series between three-phase line 2 and a neutral conductor 31. Each of the groups 8 includes a plurality of capacitor units 9 connected in parallel. It will be understood that any suitable number of capacitors may be connected in parallel in each of the groups 8 and a relatively large number of capacitors will usually be used to obtain the necessary KVAR capacity for the bank. A potential transformer 34 is connected across each phase of the bank to measure the phase voltages. The secondaries 35 of the transformers 34 are connected in series with each other and with a relay coil 32 of relay 33. Thus, relay 33 will respond to the zero sequence voltage. Relay 33 is connected to energize trip coil 4 to operate circuit breaker 3 and disconnect the capacitor bank from the line. As long as the phase impedances of the capacitor bank are equal, the zero sequence voltage will be zero, and the relay 33 will not be energized. If the impedances of the phases become unequal due to failure of capacitors in one phase, the phase voltages become unbalanced, and the relay 33 is operated by the zero sequence voltage to trip the circuit breaker 3 and disconnect the bank from the line. As is the modification of Fig. 1, the protective scheme shown in Fig. 2 will respond to unbalance due to drop in capacitance on one or more phases resulting from extreme low temperature conditions. A desensitizing network may be incorporated in the unbalance relay circuit to prevent unwanted tripping of the breaker 3. As shown in Fig. 2, the resistance 19 is connected in series with relay coil 32 of relay 33. The contacts 25 of a temperature responsive relay 20 and contacts 26 of a time delay relay 21 are connected in parallel across resistance 19. The temperature responsive relay 20 in the Fig. 2 embodiment is normally closed and the time delay relay 21 is normally open. It can be seen that at normal temperatures, when relay 20 remains closed, resistance 19 is bypassed. At low ambient temperatures relay 20 opens to effect inclusion of resistance 19 in the unbalance relay circuit. Resistance 19 is adjusted to desensitize relay 33. Time delay relay 21 is actuated upon closing of the circuit breaker 3 which closes contacts 24. Time delay relay 21 closes after the lapse of a time interval long enough to permit the cold portion of the capacitor bank to reach normal temperature. On closing of time delay relay 21, resistance 19 is bypassed, and the temperature responsive relay 20 is no longer effective to include resistance 19 in the circuit after time delay relay 21 closes to bypass resistance 19.

Should capacitor failure occur during the time interval in which unbalance relay 17 or 33 is desensitized, no damage is expected as long as the unbalance does not exceed the desensitizing setting as the resulting overvoltages in the other capacitors of the group can be tolerated for an interval of time longer than that which elapses before the time delay relay 21 operates to reactivate the unbalance relay 17 or 33.

Thus it is apparent that an effective scheme has been devised to prevent false operation of protective relays on capacitor banks which are protected by a relay system which responds to current or voltage unbalance between different phases of the bank. This problem of unwanted-trip coil operation has been encountered in a number of installations where extremely low ambient temperatures are encountered. The present invention overcomes this problem by temporarily desensitizing the protective relay when the bank is first energized if the ambient temperature is low and reactivating the protective relay when the bank has been operated long enough to raise the temperatures of the cold phases sufficiently to approximately balance the phase capacitances.

Certain embodiments of the invention have been shown and described for the purpose of illustration, but it is to be understood that the invention is not limited to these specific arrangements but in its broadest aspects it includes all equivalent embodiments and modifications which come within the scope of the invention.

I claim as my invention:

1. In a polyphase star connected capacitor bank adapted to be connected in shunt to a polyphase alternating current line, said capacitor bank comprising a plurality of similar branches of series connected groups of individual capacitor units; a protective system including current sensing means to detect neutral current flow due to capacitance unbalance in the similar branches, said current sensing means having an output network first relay means energized by said output network to respond to an unbalance of the currents in said branches and effective to disconnect said bank from said line an impedance element in said output network for desensitizing said relay and a time delay relay energized upon connection of said bank to said line operable to remove said impedance element from said output network after the elapse of a predetermined time interval after connection of said bank to said line.

2. In a polyphase star connected capacitor bank adapted to be connected in shunt to a polyphase alternating current line, said capacitor bank comprising a plurality of similar branches of series connected groups of individual capacitor units; a protective system including current sensing means to detect current flow due to capacitance unbalance in the similar branches, said current sensing means having an output network, first relay means energized by said output network to respond to an unbalance of the currents in said branches and effective to disconnect said bank from said line, an impedance element in said output network for desensitizing said relay, a temperature responsive relay operable to remove said element from said output network at temperatures above a predetermined value and a time delay relay having an actuating coil, said coil energized upon connection of said bank to said line operable to remove said impedance element from said output network after elapse of a predetermined time interval after connection of said bank to said line.

3. In a polyphase star connected capacitor bank adapted to be connected in shunt to a polyphase alternating current line, said capacitor bank comprising a plurality of similar branches of series connected groups of individual capacitor units; a protective system including voltage sensing means to detect neutral voltage displacement due to capacitance unbalance in the similar branches, said sensing means having an output network first relay means energized by said output network to respond to an unbalance of the voltages in said branches and effective to disconnect said bank from said line, an impedance element in said output network for desensitizing said first relay and a temperature responsive relay operable to remove said impedance element from said output network at ambient temperatures above a predetermined value.

4. In a polyphase star connected capacitor bank adapted to be connected in shunt to a polyphase alternating current line, said capacitor bank comprising a plurality of similar branches of series connected groups of individual capacitor units; a protective system including voltage sensing means to detect neutral voltage displacement due to capacitance unbalance in the similar branches, said sensing means having an output network; first relay means energized by said voltage output network to respond to an unbalance of the voltages in said branches and effective to disconnect said bank from said line, an impedance element in said output network for desensitizing said first relay a temperature responsive relay operable to remove said impedance element from said output network at temperatures above a predetermined value and a time delay relay having an actuating coil, said coil energized upon connection of said bank to said line operable to remove said impedance element from output network after elapse of a predetermined time interval after connection of said bank to said line.

5. In a polyphase star connected capacitor bank for a polyphase alternating current line comprising a plurality of capacitor units connected in two star connected groups, a neutral conductor for each star connected group; a protective system including a current transformer, the primary winding of said current transformer connecting said neutral conductors, a first relay, the coil of said first relay in series with the secondary winding of said current transformer, said relay responsive to current due to capacitance unbalance in said groups of capacitors, a temperature responsive relay having contacts which are closed at temperatures below a predetermined value, a normally closed time delay relay having an actuating coil, said time delay relay coil energized upon connection of said bank to said line, a desensitizing circuit for bypassing the coil of said first relay including an impedance, the contacts of said time delay relay and the contacts of said temperature responsive relay connected in series across the coil of said first relay, whereby said first relay is rendered inoperative for a predetermined time interval after connection of said bank to said line when the temperature is below a predetermined value.

6. In a polyphase star connected capacitor bank adapted to be connected in shunt to an alternating line, said capacitor bank including similar branches, each of said branches comprising a plurality of series connected groups of capacitor units, a protective system including a potential transformer connected across corresponding points on each of said branches of said capacitor bank, secondary windings of each of said potential transformers connected in series, a first relay, the coil of said first relay connected in series with said secondary windings and a resistance in series with said first relay coil for desensitizing said first relay; a temperature responsive relay and a normally open time delay relay having an actuating coil, said time delay relay coil energized upon connection of said bank to said line, the contacts of said temperature responsive relay and said time delay relay connected in parallel with said resistance said temperature responsive relay contacts being open at temperatures below a predetermined value whereby said first relay is desensitized for a predetermined time interval after connection of said bank to said line when the temperature is below a predetermined value.

7. In a star connected polyphase capacitor bank adapted to be connected in shunt to a polyphase alternating current line, said capacitor bank comprising a plurality of similar branches of series connected groups of individual capacitor units; a protective system including means for sensing neutral voltage displacement of said capacitor bank, said sensing means having an output network, a relay responsive to the output of said sensing means, an impedance element connected in said output network for desensitizing said relay and a temperature responsive means for eliminating said impedance from said network at temperatures exceeding a predetermined value.

8. In a star connected polyphase capacitor bank adapted to be connected in shunt to a polyphase alternating current line, said capacitor bank comprising a plurality of similar branches of series connected groups of individual capacitor units; a protective system including means for sensing neutral voltage displacement of said capacitor bank, said sensing means having an output network, a relay responsive to the output of said sensing means, an impedance element connected in said output network for desensitizing said relay, and a time delay relay having an actuating coil and means for energizing said actuating coil when said bank is connected to said line for eliminating said impedance from said network after elapse of a predetermined time interval after connection of said bank to said line.

9. In a star connected polyphase capacitor bank adapted to be connected in shunt to a polyphase alternating current line, said capacitor bank comprising a plurality of similar branches of series connected groups of individual capacitor units; a protective system including means for sensing neutral voltage displacement of said capacitor bank, said sensing means having an output network, a relay responsive to the output of said sensing means, a circuit breaker connecting said bank to said line, a trip coil for opening said circuit breaker, said relay being operable to actuate said trip coil, an impedance element connected in said output network for desensitizing said relay, and a temperature responsive means for eliminating said impedance element from said network at temperatures exceeding a predetermined value.

10. In a star connected polyphase capacitor bank adapted to be connected in shunt to a polyphase alternating current line, said capacitor bank comprising a plurality of similar branches of series connected groups of individual capacitor units; a protective system including means for sensing neutral voltage displacement of said capacitor bank, said sensing means having an output network, a relay responsive to the output of said sensing means, a circuit breaker connecting said bank to said line, a trip coil for opening said circuit breaker, said relay being operable to actuate said trip coil, an impedance element connected in said output network for desensitizing said relay, and a time delay relay having an actuating coil and means for energizing said actuating coil when said bank is connected to said line for eliminating said impedance element from said network after elapse of a predetermined time interval after connection of said bank to said line.

11. In a star connected polyphase capacitor bank adapted to be connected in shunt to a polyphase alternating current line, said capacitor bank comprising a plurality of similar branches of series connected groups of individual capacitor units; a protective system including means for sensing neutral voltage displacement of said capacitor bank, said sensing means having an output network, a relay responsive to the output of said sensing means, a circuit breaker connecting said bank to said line, a trip coil for opening said circuit breaker; said relay being operable to actuate said trip coil, an impedance element connected in said output network for desensitizing said relay and a time relay energized upon closing of said circuit breaker for removing said impedance element from said network after a predetermined time interval following the closing of the breaker.

12. In a polyphase capacitor bank adapted to be connected in shunt to a polyphase alternating current line, said capacitor bank comprising a plurality of similar branches of series connected groups of individual capacitor units; a protective system including, a circuit breaker connecting said bank to said line, means for sensing neutral voltage displacement of said capacitor bank, said sensing means having an output network, a relay responsive to the output of said sensing means, operable to effect opening of said circuit breaker, an impedance element connected in said output network for desensitizing said relay, a temperature responsive relay operable to remove said impedance element from said network and a time delay relay operable to remove said impedance from said network after a predetermined time interval following the closing of said circuit breaker.

References Cited in the file of this patent

UNITED STATES PATENTS

| | | |
|---|---|---|
| 1,730,858 | Marbury | Oct. 8, 1929 |
| 2,349,611 | Butler | May 23, 1944 |
| 2,550,119 | Marbury et al. | Apr. 24, 1951 |
| 2,722,656 | Marbury | Nov. 1, 1955 |